(12) United States Patent
Shveidel et al.

(10) Patent No.: US 11,416,441 B2
(45) Date of Patent: Aug. 16, 2022

(54) RPC-LESS LOCKING MECHANISM BASED ON RDMA CAW FOR STORAGE CLUSTER WITH ACTIVE-ACTIVE ARCHITECTURE

(71) Applicant: EMC IP Holding Company LLC, Hopkinton, MA (US)

(72) Inventors: Vladimir Shveidel, Pardes-Hana (IL); Leonid Ravich, Yatzitz (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/145,625

(22) Filed: Jan. 11, 2021

(65) Prior Publication Data
US 2022/0222201 A1 Jul. 14, 2022

(51) Int. Cl.
*G06F 15/173* (2006.01)
*H04L 67/1097* (2022.01)

(52) U.S. Cl.
CPC .... *G06F 15/17331* (2013.01); *H04L 67/1097* (2013.01)

(58) Field of Classification Search
CPC .............. G06F 15/17331; H04L 67/1097
USPC ........................................ 709/212
See application file for complete search history.

(56) References Cited

U.S. PATENT DOCUMENTS

| | | | |
|---|---|---|---|
| 6,145,006 A | 11/2000 | Vishlitsky et al. | |
| 10,635,348 B2 | 4/2020 | Yang et al. | |
| 10,812,584 B2 | 10/2020 | Yang et al. | |
| 11,005,970 B2 | 5/2021 | Kamran et al. | |
| 11,119,664 B2 | 9/2021 | Sun et al. | |
| 2006/0101081 A1* | 5/2006 | Lin ..................... | G06F 16/2343 |
| 2010/0118884 A1* | 5/2010 | Hendel ............. | G06F 15/17375 |
| | | | 370/412 |
| 2017/0329635 A1* | 11/2017 | Rathke ................. | G06F 9/5077 |

* cited by examiner

*Primary Examiner* — David R Lazaro
*Assistant Examiner* — Zia Khurshid
(74) *Attorney, Agent, or Firm* — BainwoodHuang

(57) ABSTRACT

Techniques for providing an RPC-less locking mechanism based on RDMA CAW for a storage cluster with an active-active architecture. The techniques include, in response to receipt at a storage node of a lock request for accessing an LBA of a storage object, synchronizing, between the storage node and a remote node, a state of a lock for the LBA. The synchronizing of the lock state includes locating an ALS object having a field containing the LBA, updating a field of the ALS object to include the storage node, and setting a field of the ALS object to a type of lock specified in the lock request. If the storage node locates the ALS object in an array maintained within visible memory on the remote node, then the storage node updates/sets corresponding fields of the ALS object by performing atomic CAW operations supported by an RDMA channel between the respective nodes.

20 Claims, 3 Drawing Sheets

RPC-LESS LOCKING MECHANISM BASED ON RDMA CAW FOR STORAGE CLUSTER WITH ACTIVE-ACTIVE ARCHITECTURE

BACKGROUND

Active-active storage systems enable data storage processors (also referred to herein as "storage nodes") in high-availability (HA) clusters to have exclusive or shared input/output (IO) access to storage objects such as volumes, logical units (LUs), file systems, or other storage resources. Active-active storage systems typically employ locks to control and synchronize such storage access by peer nodes in the HA clusters. Each lock is associated with a logical block address (LBA) of a storage object. Before writing/reading data of a write/read IO operation to/from an LBA of a storage object, a storage node in an HA cluster requests a lock for accessing the LBA of the storage object. Such a lock is generally defined as a lock object, which contains a waiting queue and a lock state for the lock. The storage node sends a remote procedure call (RPC) message to a remote peer node in the HA cluster to synchronize the lock state with the remote peer node, thereby guaranteeing coherency of data in the HA cluster. Based on a type of the requested lock (e.g., exclusive or shared), either the lock is granted immediately, or the lock request is placed in the waiting queue until the lock becomes available.

SUMMARY

Synchronizing lock states between storage nodes in high-availability (HA) clusters using RPC messaging can be problematic due to increased latency that can result from RPC messaging. For example, at least four waiting periods can be associated with RPC messaging, namely, (i) a first waiting period, in which a remote peer node waits for a next cycle of a polling process to recognize an RPC message from a storage node, (ii) a second waiting period, in which the remote peer node waits for a request contained in the RPC message to be serviced, (iii) a third waiting period, in which the storage node waits for a next cycle of a polling process to recognize an RPC reply from the remote peer node, and (iv) a fourth waiting period, in which the storage node waits for the RPC reply to be serviced. However, such waiting periods associated with RPC messaging can contribute to increasing not only an amount of time required to acquire a lock, but also an overall IO latency in an HA cluster.

Techniques are disclosed herein for providing an RPC-less locking mechanism based on RDMA CAW for a storage cluster with an active-active architecture. In the disclosed techniques, locks can be associated with logical block addresses (LBAs) of pages of storage objects such as volumes, logical units (LUs), file systems, and so on. Each lock can be defined as a lock object, which can contain at least a waiting queue and a reference to an atomic lock state (ALS) object. Each ALS object can include at least three fields, namely, (i) a target object reference field for a logical block address (LBA) of a page of a storage object, (ii) an ownership field that specifies one or more storage nodes as owners of the lock, and (iii) a lock type field that specifies a type of the lock (e.g., exclusive or shared). A plurality of ALS objects can be maintained in an ALS object array on memory visible to at least a storage node and a remote peer node in a high-availability (HA) cluster. In the disclosed techniques, the storage node and the remote peer node can be configured to communicate over a remote direct memory access (RDMA) channel. Further, each allocated ALS object in the ALS object array can be maintained on a region of memory registered for remote direct memory access over the RDMA channel.

The disclosed techniques can include, in response to receipt at the storage node of a request for a lock (a "lock request") to access an LBA of a storage object, synchronizing, between the storage node and the remote peer node, a state of the lock (a "lock state") for the LBA. The synchronizing of the lock state can include locating or allocating an ALS object having a target object reference field containing the LBA of the storage object, updating an ownership field of the ALS object to include the storage node, and setting a lock type field of the ALS object to a type of lock specified in the lock request. In the disclosed techniques, if the storage node locates the allocated ALS object in an ALS object array maintained on visible memory of the remote peer node, then the storage node can update and/or set corresponding fields of the ALS object by performing atomic compare-and-write (CAW) operations supported by the RDMA channel between the storage node and the remote peer node. By synchronizing, between a storage node and a remote peer node in an HA cluster, a state of a lock for an LBA of a storage object by performing atomic CAW operations over an RDMA channel, the use of RPC messaging between the storage node and the remote peer node can be reduced. As a result, an amount of time required to acquire the lock, as well as an overall IO latency in the HA cluster, can also be reduced.

In certain embodiments, a method of locking an entity of a storage object in a storage cluster with an active-active architecture includes maintaining a lock state object on a memory of a first storage node. The lock state object includes a first field for a lock state of an entity of a storage object, and the memory is registered for remote direct memory access (RDMA). The method further includes, in response to receipt at a second storage node of a request for a lock to access the entity of the storage object, accessing, by the second storage node, the lock state object by performing a first RDMA operation between the first storage node and the second storage node, and updating, by the second storage node, the first field of the lock state object by performing a second RDMA operation between the first storage node and the second storage node, thereby synchronizing the lock state between the first storage node and the second storage node.

In certain arrangements, the performing of the first RDMA operation between the first storage node and the second storage node includes performing a remote compare-and-write (CAW) operation against a mutex value associated with a lock state object bucket including the lock state object.

In certain arrangements, the performing of the second RDMA operation between the first storage node and the second storage node includes setting the first field of the lock state object to a value indicating that at least the second storage node is an owner of the lock.

In certain arrangements, the accessing of the lock state object includes allocating the lock state object on the memory of the first storage node by performing a third RDMA operation between the first storage node and the second storage node.

In certain arrangements, the lock state object includes a second field, and wherein the performing of the third RDMA operation between the first storage node and the second storage node includes setting the second field of the lock state object to a value of the entity of the storage object.

In certain arrangements, the lock state object includes a third field, and the accessing of the lock state object includes performing a fourth RDMA operation between the first storage node and the second storage node. The fourth RDMA operation includes setting the third field of the lock state object to a value indicating a type of lock specified by the request.

In certain arrangements, the lock state object includes a second field, and the accessing of the lock state object includes locating the lock state object on the memory of the first storage node by performing a third RDMA operation between the first storage node and the second storage node.

In certain arrangements, the performing of the third RDMA operation between the first storage node and the second storage node includes inspecting the first field of the lock state object to determine that at least the second storage node is the owner of the lock.

In certain arrangements, the inspecting of the first field of the lock state object includes determining that the second storage node is the sole owner of the lock.

In certain arrangements, the method further includes releasing, by the second storage node, the lock by performing a fourth RDMA operation between the first storage node and the second storage node.

In certain arrangements, the lock state object includes a second field having a value of the entity of the storage object, and the performing of the fourth RDMA operation between the first storage node and the second storage node includes replacing the value of the entity in the second field of the lock state object with a predetermined unspecified entity value.

In certain arrangements, each of the first storage node and the second storage node is the owner of the lock, the releasing of the lock includes performing a fifth RDMA operation between the first storage node and the second storage node, and the performing of the fifth RDMA operation includes updating the first field of the lock state object to a value indicating that the first storage node is the sole owner of the lock.

In certain arrangements, the lock includes a waiting queue and a reference to the lock state object, the waiting queue is on the memory of the first storage node, and the waiting queue includes a process thread waiting for the lock. The method further includes registering the lock state object with a poller on the first storage node, and periodically polling, by the poller, the lock state object to detect the updating of the first field of the lock state object to the value indicating that the first storage node is the sole owner of the lock.

In certain arrangements, the method further includes, having detected the updating of the first field of the lock state object, providing a notification of the updating to the process thread in the waiting queue.

In certain embodiments, a system for locking an entity of a storage object in a storage cluster with an active-active architecture includes a memory and processing circuitry configured to execute program instructions out of the memory to maintain a lock state object on a memory of a first storage node. The lock state object includes a first field for a lock state of an entity of a storage object, and the memory is registered for remote direct memory access (RDMA). The processing circuitry is further configured to execute the program instructions out of the memory, in response to receipt at a second storage node of a request for a lock to access the entity of the storage object, to access, by the second storage node, the lock state object by performing a first RDMA operation between the first storage node and the second storage node, and to update, by the second storage node, the first field of the lock state object by performing a second RDMA operation between the first storage node and the second storage node, thereby synchronizing the lock state between the first storage node and the second storage node.

In certain arrangements, the processing circuitry is further configured to execute the program instructions out of the memory to perform the first RDMA operation between the first storage node and the second storage node, including performing a remote compare-and-write (CAW) operation against a mutex value associated with a lock state object bucket including the lock state object.

In certain arrangements, the processing circuitry is further configured to execute the program instructions out of the memory to perform the second RDMA operation between the first storage node and the second storage node, including setting the first field of the lock state object to a value indicating that at least the second storage node is an owner of the lock.

In certain embodiments, a computer program product includes a set of non-transitory, computer-readable media having instructions that, when executed by processing circuitry, cause the processing circuitry to perform a method of locking an entity of a storage object in a storage cluster with an active-active architecture. The method includes maintaining a lock state object on a memory of a first storage node. The lock state object includes a first field for a lock state of an entity of a storage object, and the memory is registered for remote direct memory access (RDMA). The method further includes, in response to receipt at a second storage node of a request for a lock to access the entity of the storage object, accessing, by the second storage node, the lock state object by performing a first RDMA operation between the first storage node and the second storage node, and updating, by the second storage node, the first field of the lock state object by performing a second RDMA operation between the first storage node and the second storage node, thereby synchronizing the lock state between the first storage node and the second storage node.

Other features, functions, and aspects of the present disclosure will be evident from the Detailed Description that follows.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views.

FIG. 1b is a block diagram of an active-active storage system included in the data storage environment of FIG. 1a;

FIG. 2b is a block diagram of an exemplary ALS object bucket that can be included in the ALS object array of FIG. 2a;

DETAILED DESCRIPTION

Techniques are disclosed herein for providing an RPC-less locking mechanism based on RDMA CAW for a storage cluster with an active-active architecture. In the disclosed techniques, a storage node and a remote peer node in a high-availability (HA) cluster can be configured to communicate over a remote direct memory access (RDMA) channel. The disclosed techniques can include, in response to receipt at the storage node of a request for a lock (a "lock request") to access a logical block address (LBA) of a storage object, synchronizing, between the storage node and the remote peer node, a state of the lock (a "lock state") for the LBA. The synchronizing of the lock state can include locating or allocating an ALS object having a target object reference field containing the LBA of the storage object, updating an ownership field of the ALS object to include the storage node, and setting a lock type field of the ALS object to a type of lock specified in the lock request. In the disclosed techniques, if the storage node locates the allocated ALS object in an ALS object array maintained on visible memory of the remote peer node, then the storage node can update and/or set corresponding fields of the ALS object by performing atomic compare-and-write (CAW) operations supported by the RDMA channel between the storage node and the remote peer node. By synchronizing, between a storage node and a remote peer node in an HA cluster, a state of a lock for an LBA of a storage object by performing atomic CAW operations over an RDMA channel, the use of remote procedure call (RPC) messaging between the storage node and the remote peer node can be reduced. As a result, an amount of time required to acquire the lock, as well as an overall IO latency in the HA cluster, can also be reduced.

Figure 1B:
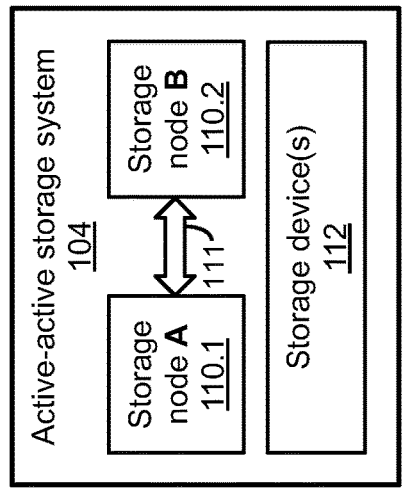
Figure 1A:
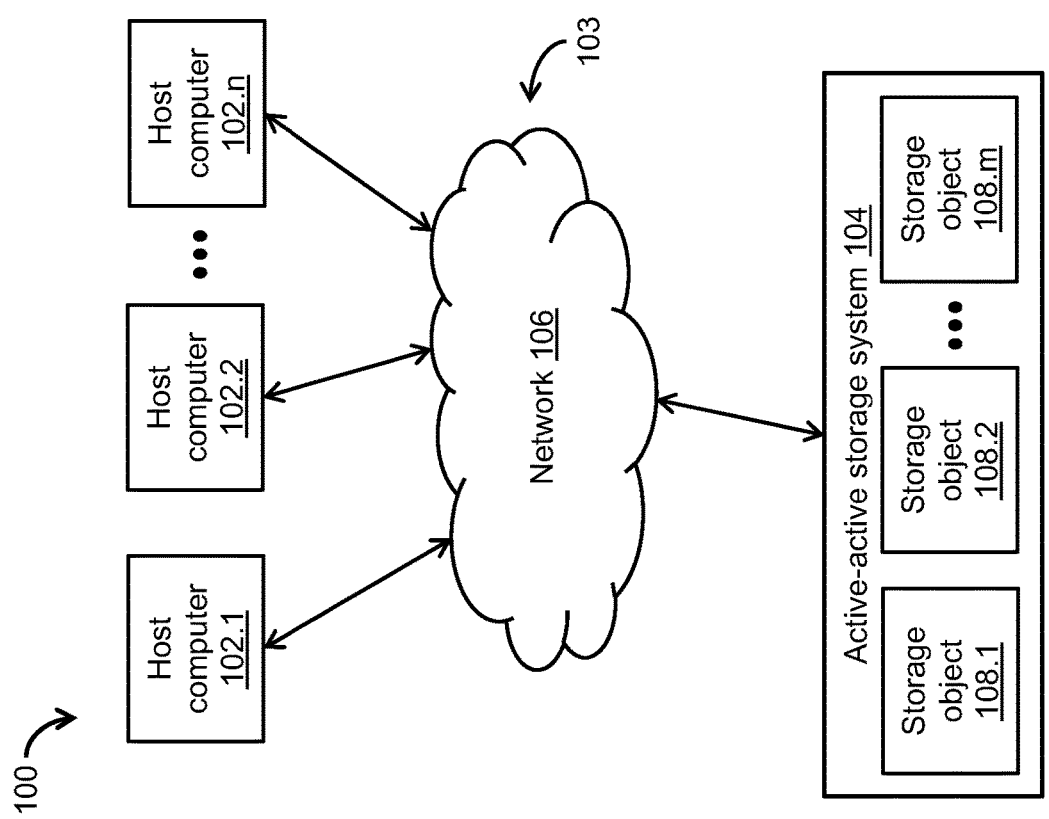
FIG. 1a is a block diagram of an exemplary data storage environment, in which techniques can be practiced for providing an RPC-less locking mechanism based on RDMA CAW for a storage cluster with an active-active architecture.

FIG. 1a depicts an illustrative embodiment of an exemplary data storage environment 100, in which techniques can be practiced for providing an RPC-less locking mechanism based on RDMA CAW for a storage cluster with an active-active architecture. As shown in FIG. 1a, the data storage environment 100 can include a plurality of host computers 102.1, 102.2, . . . , 102.n, an active-active storage system 104, and a communications medium 103 that includes at least one network 106. For example, each of the plurality of host computers 102.1, . . . , 102.n can be configured as a web server computer, a file server computer, an email server computer, an enterprise server computer, and/or any other suitable client/server computer or computerized device. The plurality of host computers 102.1, . . . , 102.n can be configured to provide, over the network 106, storage input/output (IO) requests (e.g., small computer system interface (SCSI) commands, network file system (NFS) commands) to the active-active storage system 104. Such storage IO requests (e.g., write IO requests, read IO requests) can direct a data storage processor (also referred to herein as a "storage node") to write or read data blocks, data pages, data files, or any other suitable data elements to/from volumes (VOLs), logical units (LUs), file systems, and/or any other suitable storage objects, such as storage objects 108.1, 108.2, . . . , 108.m maintained in association with the active-active storage system 104.

The communications medium 103 can be configured to interconnect the plurality of host computers 102.1, . . . , 102.n and multiple storage nodes of the active-active storage system 104 to enable them to communicate and exchange data and/or control signaling. As shown in FIG. 1a, the communications medium 103 can be illustrated as a "cloud" to represent different communications topologies such as a backbone topology, a hub-and-spoke topology, a loop topology, an irregular topology, and so on, or any suitable combination thereof. As such, the communications medium 103 can include copper-based data communications devices and cabling, fiber optic-based communications devices and cabling, wireless communications devices, and so on, or any suitable combination thereof. Further, the communications medium 103 can be configured to support storage area network (SAN) communications, network attached storage (NAS) communications, local area network (LAN) communications, metropolitan area network (MAN) communications, wide area network (WAN) communications, wireless communications, distributed infrastructure communications, and/or any other suitable communications.

FIG. 1b depicts another view of the active-active storage system 104 of FIG. 1a. As employed herein, the term "active-active storage system" refers to a highly available clustered storage system (also referred to herein as a "high-availability cluster"), in which multiple storage nodes have shared or exclusive read-write IO access to the same storage objects (e.g., volumes (VOLs), logical units (LUs), file systems). As shown in FIG. 1b, the active-active storage system 104 can include at least two storage nodes for high-availability (HA), namely, a storage node A 110.1 and a storage node B 110.2. The storage node A 110.1 and the storage node B 110.2 can be communicably connected to one another by a communication path 111, which can be configured as a remote direct memory access (RDMA) channel. For example, the storage node A 110.1 can receive storage IO requests from the respective host computers 102.1, . . . , 102.n over the network 106. In response to the storage IO requests, the storage node A 110.1 can perform storage IO operations (e.g., read-write IO operations) to write/read data blocks, data pages, data files, or any other suitable data elements to/from one or more of the plurality of storage objects 108.1, . . . , 108.m. Further, at least at intervals, the storage node A 110.1 can update and/or synchronize page reference or description information pertaining to read-write IO operations maintained in a journal by the storage node A 110.1 with corresponding page reference or description information maintained in a journal by the storage node B 110.2. In the event of a failure of the storage node A 110.1 or at any other suitable time, the storage node B 110.2 can assume the role and/or duties of the storage node A 110.1 with regard to the handling of storage IO requests, providing high availability within the active-active storage system 104. The active-active storage system 104 can further include one or more storage devices 112, which can include one or more of a non-volatile random-access memory (NVRAM), a solid-state drive (SSD), a hard drive, a flash memory, and/or any other suitable storage device(s) for storing storage object data and/or metadata.

Figure 2B:
Figure 2C:
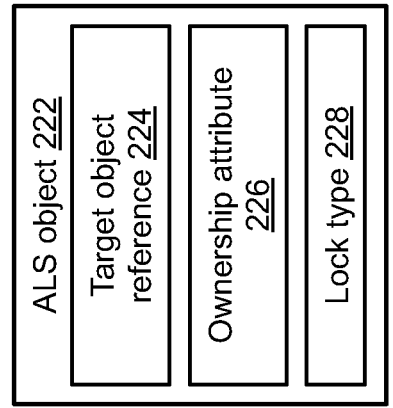
FIG. 2c is a block diagram of an exemplary ALS object that can be included in the ALS object bucket of FIG. 2b.
Figure 2A:
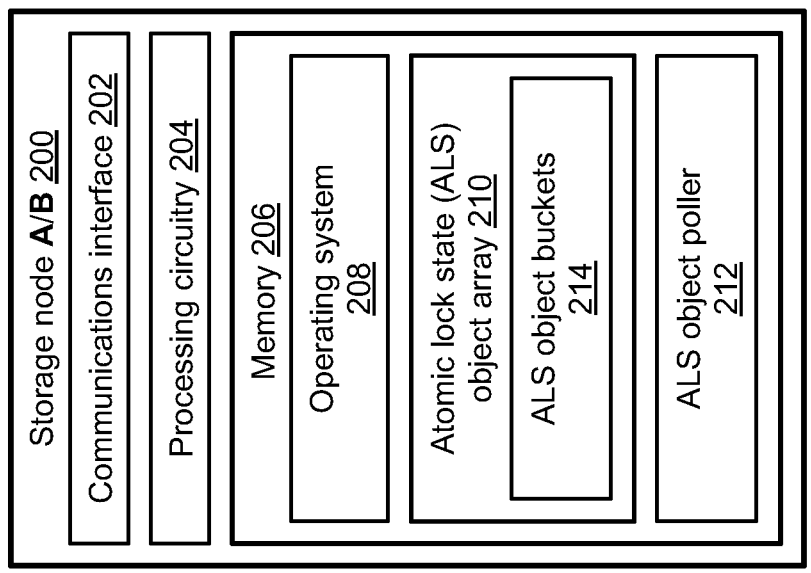
FIG. 2a is a block diagram of an exemplary storage node that can be included in the active-active storage system of FIG. 1b, in which the storage node has a memory configured to include an atomic lock state (ALS) object array and an ALS object poller.

FIG. 2a depicts an exemplary storage node A/B 200 that can be included in the active-active storage system 104 of FIG. 1b. It is noted that each of the storage node A 110.1 and the storage node B 110.2 of the active-active storage system 104 can be configured like the storage node A/B 200. As shown in FIG. 2a, the storage node A/B 200 can include a communications interface 202, processing circuitry 204, and a memory 206. The communications interface 202 can include one or more of an InfiniBand interface, an Ethernet interface, an IEEE 802.11x (WiFi) interface, a Bluetooth interface, and/or any other suitable communications interface. The communications interface 202 can further include SCSI target adapters, network interface adapters, and/or any other suitable adapters for converting electronic, optical, and/or wireless signals received over the network 106 to a form suitable for use by the processing circuitry 204.

The memory 206 can include persistent memory (e.g., flash memory, magnetic memory) and/or non-persistent memory (e.g., dynamic random-access memory (DRAM), static random-access memory (SRAM)). The memory 206 can be configured to store a variety of software constructs realized in the form of program instructions, which can be executed by the processing circuitry 204 to carry out the techniques and/or methods disclosed herein. As further shown in FIG. 2a, the memory 206 can further include an operating system (OS) 208 such as a Linux OS, Unix OS, Windows OS, or any other suitable operating system. The memory 206 can be further configured to maintain one or more data structures such as an atomic lock state (ALS) object array 210, as well as an ALS object poller 212. In some embodiments, the ALS object array 210 can be configured to include a plurality of ALS object buckets 214.

The processing circuitry 204 can include one or more physical storage processors and/or engines configured to execute the program instructions stored on the memory 206, as well as data movers, director boards, blades, IO modules, storage drive controllers, switches, and/or any other suitable computer hardware or combination thereof. For example, the processing circuitry 204 can be configured to execute the program instructions out of the memory 206, process storage IO requests (e.g., write IO requests, read IO requests) issued by the respective host computers 102.1, . . . , 102.n, and/or store user data and/or metadata on the storage device(s) 112 within the data storage environment 100, such as a clustered RAID environment. It is noted that the storage node AB 200 can further include a keyboard, a mouse, or any other suitable IO device(s), a display, an uninterruptable power supply (UPS), or any other suitable storage node component(s).

In the context of the processing circuitry 204 being configured to execute program instructions out of the memory 206, a computer program product can be configured to deliver all or a portion of the program instructions and data structures stored and/or maintained on the memory 206 to the processing circuitry 204. Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. Further, the non-transient computer-readable storage media can be encoded with sets of program instructions and data structures for performing, when executed by the processing circuitry 204, the various techniques and/or methods disclosed herein.

FIG. 2b depicts an exemplary ALS object bucket 216 from among the plurality of ALS object buckets 214 included in the ALS object array 210 of FIG. 2a. As shown in FIG. 2b, the ALS object bucket 216 can be configured to maintain a plurality of ALS objects 218 and a field 220 for an ALS object bucket mutex. FIG. 2c depicts an exemplary ALS object 222 from among the plurality of ALS objects 218 maintained by the ALS object bucket 216. As shown in FIG. 2c, the ALS object 222 can include a plurality of fields, such as a first field 224 for a target object reference, a second field 226 for an ownership attribute, and a third field 228 for a lock type. It is noted that functionality pertaining to each of the ALS object array 210, the ALS object bucket 216, the ALS object 222, as well as the ALS object poller 212, is described below with reference to one or more illustrative examples of the disclosed techniques.

During operation, a storage node included in the active-active storage system 104 (e.g., the storage node A 110.1, the storage node B 110.2) can receive a storage IO request for a storage object from a host computer (e.g., one of the host computers 102.1, . . . , 102.n) and set a lock on an entity associated with the storage object. In the disclosed techniques, such a lock can be associated with an LBA of a page of the storage object, such as a volume, an LU, a file system, and so on. As employed herein, the term "lock" refers to any suitable synchronization object (or variable) configured to control access to an entity of a storage object. In some embodiments, a lock can be set by transitioning the lock from a first state to a second state. The first state of the lock can be configured to prevent certain access to the entity associated with the storage object, while the second state of the lock can be configured to permit certain access to the entity associated with the storage object. In some embodiments, the lock can be released by transitioning the lock from the second state to the first state. In the disclosed techniques, each such lock can be defined as a lock object, which can contain at least a waiting queue and a reference to an ALS object (e.g., the ALS object 222). A plurality of ALS objects can be maintained in an ALS object array (e.g., the ALS object array 210) on memory visible to at least a storage node and a remote peer node in a high-availability (HA) cluster. In the disclosed techniques, the storage node and the remote peer node can be embodied as the storage node A 110.1 and the storage node B 110.2, respectively, in the active-active storage system 104. Further, the storage node A 110.1 and the storage node B 110.2 can communicate over the communication path 111 configured as a remote direct memory access (RDMA) channel. Each allocated ALS object 222 in the ALS object array 210 can be maintained on a region of memory registered for remote direct memory access over the RDMA channel 111.

The disclosed techniques can include, in response to receipt at the storage node A 110.1 of a request for a lock (a "lock request") to access an LBA of a storage object, synchronizing, between the storage node A 110.1 and the storage node B 110.2, a state of the lock (a "lock state") for the LBA. The synchronizing of the lock state can include locating or allocating an ALS object having a target object reference field containing the LBA of the storage object, updating an ownership field of the ALS object to include the storage node A 110.1, and setting a lock type field of the ALS object to a type of lock specified in the lock request (e.g., exclusive or shared). In the disclosed techniques, if the storage node A 110.1 locates the allocated ALS object in an ALS object array maintained on visible memory of the storage node B 110.2, then the storage node A 110.1 can update and/or set corresponding fields of the ALS object by performing atomic compare-and-write (CAW) operations supported by the RDMA channel 111 between the storage node A 110.1 and the storage node B 110.2. By synchronizing, between a storage node and a remote peer node in an HA cluster, a state of a lock for an LBA of a storage object by performing atomic CAW operations over an RDMA channel, the use of RPC messaging between the storage node and the remote peer node can be reduced. As a result, an amount of time required to acquire the lock, as well as an overall IO latency in the HA cluster, can also be reduced.

The disclosed techniques of providing an RPC-less locking mechanism based on RDMA CAW for a storage cluster with an active-active architecture will be further understood with reference to the following illustrative examples. In these examples, the storage node A 110.1 and the storage node B 110.2 of the active-active storage system 104 (see FIG. 1b) are referred to simply as the "storage node A" and the "remote peer node B", respectively. Further, it is assumed that an ALS object array like the ALS object array 210 (see FIG. 2a) is maintained on memory visible to the storage node A and remote peer node B. In other words, the ALS object array is maintained on regions of memory registered for remote direct memory access (RDMA) over an RDMA channel, such as the RDMA channel 111 (see FIG. 1b) communicably connecting the storage node A and remote peer node B. Each ALS object included in the ALS object array can therefore be accessed by the storage node A and the remote peer node B in a high-availability (HA) cluster by either local access or remote direct memory access.

In some embodiments, one half of the ALS object array can be configured for local access by the storage node A and remote direct memory access by the remote peer node B, and the other half of the ALS object array can be configured for local access by the remote peer node B and remote direct memory access by the storage node A. Further, accessibility (local or remote) of ALS objects maintained by a plurality of ALS object buckets included in the ALS object array can be denoted by corresponding index values in the ALS object array. For example, "even" index values in the ALS object array can denote ALS objects accessible to the storage node A by local access and accessible to the remote peer node B by RDMA, and "odd" index values in the ALS object array can denote ALS objects that are accessible to the remote peer node B by local access and accessible to the storage node A by RDMA. In addition, each of the plurality of ALS object buckets included in the ALS object array can be denoted by a hash of a target object reference (e.g., LBA), as specified by an ALS object referenced by a requested lock object. In this way, balance and symmetry can be maintained in the implementation of the ALS object array.

In some embodiments, each of the ALS object buckets in the ALS object array can have a predetermined bucket size. For example, if the predetermined bucket size is equal to 64, then ALS objects with index values 0-63 in the ALS object array can be maintained in a first ALS object bucket, ALS objects with index values 64-127 in the ALS object array can be maintained in a second ALS object bucket, and so on. Further, each ALS object bucket can be configured to maintain an ALS object bucket mutex field like the ALS object bucket mutex field 220 (see FIG. 2b), which can be registered for remote direct memory access and therefore visible to both of the storage node A and the remote peer node B. For example, if the ALS object bucket mutex field for a particular ALS object bucket contains the value "1" indicating that the ALS object bucket is "locked", then it can be assumed that an ALS object maintained by that particular ALS object bucket is in the process of being either allocated or freed. Otherwise, if the ALS object bucket mutex field for the particular ALS object bucket contains the value "0" indicating that the ALS object bucket is "unlocked", then it can be assumed that no ALS objects maintained by that particular ALS object bucket are in the process of being either allocated or freed. To access such an ALS object bucket, a compare-and-write (CAW) operation (local or remote) can be performed to compare the value of the ALS object bucket mutex field with the value "0". If the CAW operation is successful (i.e., the value of the ALS object bucket mutex field is determined to be "0"), then access to the ALS object bucket can be granted and the value "1" can be written to the ALS object bucket mutex field to lock the ALS object bucket. In this way, a subsequent access to the ALS object bucket can be prevented until the ALS object bucket is again unlocked. Otherwise, if the CAW operation is unsuccessful (i.e., the value of the ALS object bucket mutex field is determined to be "1"), then the CAW operation can be repeated in a spinlock manner until a successful result is achieved. It is noted that such an ALS object bucket can be locked by atomically setting the value of its ALS object bucket mutex field to "1" or unlocked by atomically setting the value of its ALS object bucket mutex field to "0".

In a first illustrative example, it is assumed that a request for a lock (a "lock request") to access an LBA of a target object is received at the storage node A. In response to the lock request, the storage node A synchronizes with the remote peer node B a state of the lock (a "lock state") for the LBA of the target object. In this first example, the synchronizing of the lock state includes allocating an ALS object in the ALS object array maintained on memory visible to the storage node A and the remote peer node B. To that end, the storage node A calculates a hash of the LBA of the target object and locates an ALS object bucket denoted by the calculated hash value in the ALS object array. Having located the ALS object bucket, the storage node A performs a local or remote CAW operation to gain access to the ALS object bucket. For example, if the ALS object bucket is located in a portion of the ALS object array on the memory of the storage node A, then the storage node A can perform a local CAW operation against a value in the ALS object bucket mutex field of the ALS object bucket. Otherwise, if the ALS object bucket is located in a portion of the ALS object array on the memory of the remote peer node B, then the storage node A can perform a remote CAW operation against the value in the ALS object bucket mutex field of the ALS object bucket. Having gained access to the ALS object bucket, the storage node A locks the ALS object bucket to prevent any subsequent access to the ALS object bucket by another node in the HA cluster. For example, the storage node A can lock the ALS object bucket by atomically setting the value of its ALS object bucket mutex field to "1". The storage node A then searches among a plurality of ALS objects maintained by the ALS object bucket for a "free" ALS object. In some embodiments, such a free ALS object can include a target object reference field containing the designation "Unspecified LBA" or any other suitable designation. Once a free ALS object is found in the ALS object bucket, the storage node A replaces the Unspecified LBA designation in the target object reference field of the free ALS object with the LBA of the target object. The storage node A then unlocks the ALS object bucket. For example, the storage node A can unlock the ALS object bucket by atomically setting the value of its ALS object bucket mutex field to "0".

In a second illustrative example, it is again assumed that a request for a lock (a "lock request") to access an LBA of a target object is received at the storage node A. In this second example, however, a determination is made as to whether a lock already exists for the LBA of the target object. As described herein, such a lock can be defined as a lock object containing at least a waiting queue and a reference to an ALS object. If the lock object does not already exist, then the storage node A calculates a hash of the LBA of the target object, locates the ALS object bucket denoted by the calculated hash value in the ALS object array, gains access to the ALS object bucket (e.g., by performing a local or remote CAW operation), locks the ALS object bucket to prevent a subsequent access, and searches among a plurality of ALS objects maintained by the ALS object bucket for an ALS object that includes a target object reference field containing the LBA of the target object. If the ALS object is found, then the storage node A can update the ownership attribute field of the ALS object.

In some embodiments, the ownership attribute field can contain one of four attributes, namely, (i) an attribute "A" indicating that the storage node A is the sole owner of the corresponding lock object, (ii) an attribute "B" indicating that the remote peer node B is the sole owner of the corresponding lock object, (iii) an attribute "AB" indicating that both the storage node A and the remote peer node B are owners of the corresponding lock object, but the lock type field of the ALS object was set by the storage node A, and (iv) an attribute "BA" indicating that both the storage node A and the remote peer node B are owners of the corresponding lock object, but the lock type field of the ALS object was set by the remote peer node B. As employed herein, the term "owner" refers to a node of an HA cluster that has one or more process threads that currently hold a lock object or are in a waiting queue for the lock object. In this second example, it is assumed that the ownership attribute field of the ALS object contains the attribute "B" indicating that only the remote peer node B owns the corresponding lock object. Accordingly, the storage node A updates the ownership attribute field by replacing the attribute "B" with "BA".

If the ALS object is not found, then the storage node A can allocate a new ALS object as described herein with reference to the first example. Having allocated the new ALS object, the storage node A can set the ownership attribute field of the ALS object to include the attribute "A". Further, the storage node A can set the lock type field of the ALS object to a type of lock specified in the lock request (e.g., exclusive or shared). In some embodiments, an "exclusive" type of lock can correspond to a write lock, and a "shared" type of lock can correspond to a read lock. Such an exclusive write lock can only be held by one process thread and cannot coexist with a shared read lock. If the lock type specified in the lock request and the lock type indicated in the lock type field of the ALS object are both "shared", then the lock request can be granted immediately. Otherwise, the lock request can be queued in the waiting queue of the lock object until future notification. The storage node A can then unlock the ALS object bucket. For example, the storage node A can unlock the ALS object bucket by atomically setting the value of its ALS object bucket mutex field to "0".

If the lock object already exists, then a determination is made as to whether the ownership attribute field of the ALS object referenced by the lock object includes an attribute that makes reference to the storage node A. If the attribute included in the ownership attribute field does not make reference to the storage node A (e.g., the ownership attribute field includes the attribute "B"), then the storage node A updates the ownership attribute field by replacing the attribute "B" with "BA", including performing a local or remote CAW operation against a value in the ALS object bucket mutex field of the corresponding ALS object bucket. If the lock type specified in the lock request and the lock type indicated in the lock type field of the ALS object are both "shared", then the lock request can be granted immediately. Otherwise, the lock request can be queued in the waiting queue of the lock object until future notification. The storage node A can then unlock the ALS object bucket.

In a third illustrative example, it is assumed that a lock request received at the storage node A from a host computer for accessing an LBA of a target object has been granted, a corresponding storage IO request (e.g., write IO request, read IO request) has been serviced, and an acknowledgement has been sent by the storage node A to the host computer. Once the acknowledgement has been sent to the host computer, the storage node A can release the lock. To that end, the storage node A gains access to the ALS object bucket (e.g., by performing a local or remote CAW operation) denoted by a hash of the LBA of a target object, locks the ALS object bucket, and locates the ALS object that includes a target object reference field containing the LBA of the target object. Having located the ALS object, the storage node A inspects the ownership attribute field of the ALS object to determine whether it is the sole owner of the lock. If it is determined that the storage node A is the sole owner of the lock, then the storage node A releases the lock by replacing the LBA in the target object reference field of the ALS object with the designation "Unspecified LBA" or any other suitable designation. Otherwise, if it is determined that the storage node A is not the sole owner of the lock (e.g., the remote peer node B is also an owner of the lock), then the storage node A updates the ownership attribute field of the ALS object by replacing the attribute "AB" or "BA" with "B". The lock can then be released at a later time by the remote peer node B.

In this third example, it is further assumed that the lock object containing the waiting queue for the lock is maintained on visible memory of the remote peer node B, and that one or more process threads are in the waiting queue for the lock. In this case, the process threads in the waiting queue need to be notified when the lock state has been changed by the storage node A, such as by the updating of the ownership attribute field of the ALS object from the attribute "AB" or "BA" to the attribute "B". To that end, once a process thread is placed in the waiting queue for the lock, the remote peer node B registers the ALS object with an ALS object poller (e.g., the ALS object poller 212; see FIG. 2*a*) maintained on memory of the remote peer node B. The ALS object poller then periodically polls the ALS object(s) registered with it. Upon detection of a change in a lock state associated with one of its registered ALS objects (e.g., the ownership attribute of the ALS object being changed from "AB" or "BA" to "B"), the ALS object poller provides notifications to the process threads in the waiting queue of the corresponding lock object. In this way, it can be guaranteed that the process threads in the waiting queue for the lock on the remote peer node B will be notified of a change in the lock state made by the storage node A.

Figure 3:
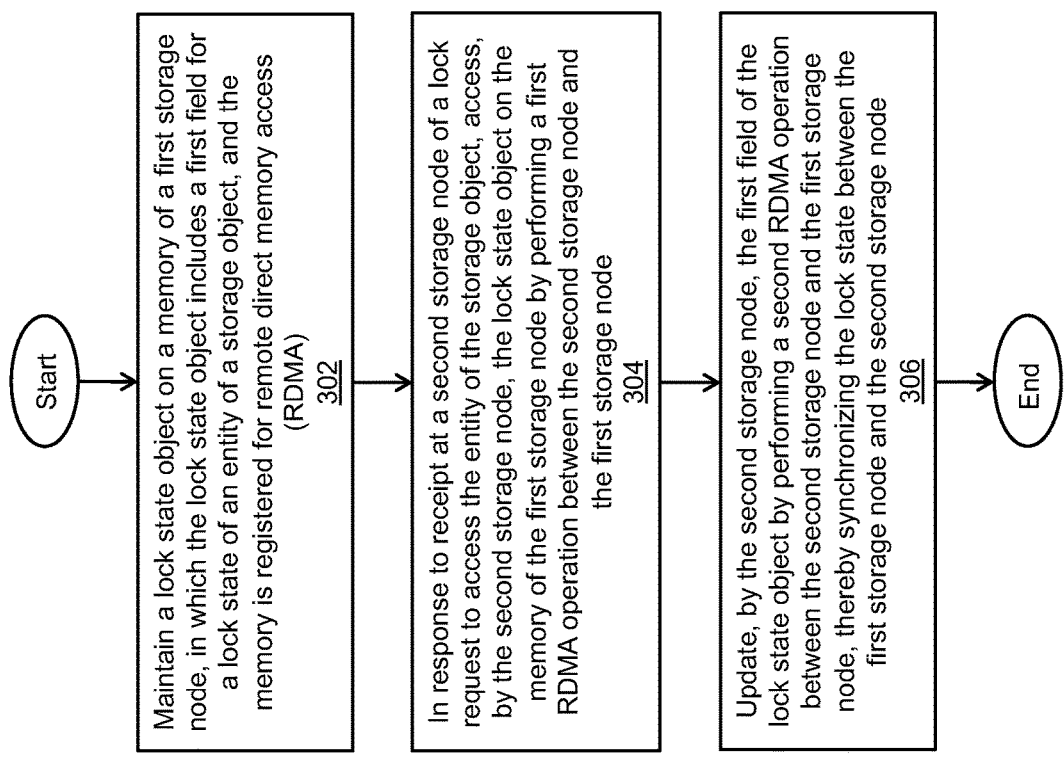
FIG. 3 is a flow diagram of an exemplary method of providing an RPC-less locking mechanism based on RDMA CAW for a storage cluster with an active-active architecture.

An exemplary method of providing an RPC-less locking mechanism based on RDMA CAW for a storage cluster with an active-active architecture is described below with reference to FIG. 3. As depicted in block 302, a lock state object is maintained on a memory of a first storage node, in which the lock state object includes a first field for a lock state of an entity of a storage object, and the memory is registered for remote direct memory access (RDMA). As depicted in block 304, in response to receipt at a second storage node of a lock request to access the entity of the storage object, the lock state object is located, by the second storage node, on the memory of the first storage node by performing a first RDMA operation between the second storage node and the first storage node. As depicted in block 306, the first field of the lock state object is updated, by the second storage node, by performing a second RDMA operation between the second storage node and the first storage node, thereby synchronizing the lock state between the first storage node and the second storage node.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a data storage system used for block-based, file-based, or object storage. Storage arrays can include, for example, dedicated storage hardware containing HDDs, SSDs, and/or all-flash drives. A data storage entity may be a filesystem, an object storage, a virtualized device, a logical unit (LU), a logical unit number (LUN), a logical volume (LV), a logical device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit may be a physical entity such as a drive or disk or an array of drives or disks for storing data in storage locations that can be accessed by addresses. A physical storage unit may be used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and/or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "TO request" or simply "TO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any particular embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of locking an entity of a storage object in a storage cluster with an active-active architecture, comprising:
    maintaining a lock state object on a memory of a first storage node, the lock state object including a first field for a lock state of an entity of a storage object, and the memory being registered for remote direct memory access (RDMA);
    in response to receipt at a second storage node of a request for a lock to access the entity of the storage object, accessing, by the second storage node, the lock state object by performing an atomic RDMA compare-and-write (CAW) operation against a mutex value associated with a lock state object bucket that includes the lock state object; and
    updating, by the second storage node, the first field of the lock state object by performing a second RDMA operation between the first storage node and the second storage node, thereby synchronizing the lock state between the first storage node and the second storage node.

2. The method of claim 1 wherein the performing of the second RDMA operation between the first storage node and the second storage node includes setting the first field of the lock state object to a value indicating that at least the second storage node is an owner of the lock.

3. The method of claim 2 wherein the accessing of the lock state object includes allocating the lock state object on the memory of the first storage node by performing a third RDMA operation between the first storage node and the second storage node.

4. The method of claim 3 wherein the lock state object includes a second field, and wherein the performing of the third RDMA operation between the first storage node and the second storage node includes setting the second field of the lock state object to a value of the entity of the storage object.

5. The method of claim 4 wherein the lock state object includes a third field, and wherein the accessing of the lock state object includes performing a fourth RDMA operation between the first storage node and the second storage node, the fourth RDMA operation including setting the third field of the lock state object to a value indicating a type of lock specified by the request.

6. The method of claim 2 wherein the lock state object includes a second field, and wherein the accessing of the lock state object includes locating the lock state object on the memory of the first storage node by performing a third RDMA operation between the first storage node and the second storage node.

7. The method of claim 6 wherein the performing of the third RDMA operation between the first storage node and the second storage node includes inspecting the first field of the lock state object to determine that at least the second storage node is the owner of the lock.

8. The method of claim 7 wherein the inspecting of the first field of the lock state object includes determining that the second storage node is the sole owner of the lock.

9. The method of claim 8 further comprising:
releasing, by the second storage node, the lock by performing a fourth RDMA operation between the first storage node and the second storage node.

10. The method of claim 9 wherein the lock state object includes a second field having a value of the entity of the storage object, and wherein the performing of the fourth RDMA operation between the first storage node and the second storage node includes replacing the value of the entity in the second field of the lock state object with a predetermined unspecified entity value.

11. The method of claim 10 wherein each of the first storage node and the second storage node is the owner of the lock, wherein the releasing of the lock includes performing a fifth RDMA operation between the first storage node and the second storage node, and wherein the performing of the fifth RDMA operation includes updating the first field of the lock state object to a value indicating that the first storage node is the sole owner of the lock.

12. The method of claim 11 wherein the lock includes a waiting queue and a reference to the lock state object, wherein the waiting queue is on the memory of the first storage node, wherein the waiting queue includes a process thread waiting for the lock, and wherein the method further comprises:
registering the lock state object with a poller on the first storage node; and
periodically polling, by the poller, the lock state object to detect the updating of the first field of the lock state object to the value indicating that the first storage node is the sole owner of the lock.

13. The method of claim 12 further comprising:
having detected the updating of the first field of the lock state object, providing a notification of the updating to the process thread in the waiting queue.

14. The method of claim 1 wherein the performing of the atomic RDMA CAW operation includes executing a compare operation and a write operation atomically, wherein the executing of the compare operation and the write operation atomically comprises:
in the compare operation, comparing the mutex value with a first predetermined value to produce a comparison result, the mutex value being contained in a mutex field; and
in the write operation, in response to the comparison result indicating that the mutex value is equal to the first predetermined value, writing, atomically with the compare operation, a second predetermined value to the mutex field.

15. A system for locking an entity of a storage object in a storage cluster with an active-active architecture, comprising:
a memory; and
processing circuitry configured to execute program instructions out of the memory to:
maintain a lock state object on a memory of a first storage node, the lock state object including a first field for a lock state of an entity of a storage object, and the memory being registered for remote direct memory access (RDMA);
in response to receipt at a second storage node of a request for a lock to access the entity of the storage object, access, by the second storage node, the lock state object by performing a first RDMA operation between the first storage node and the second storage node; and
update, by the second storage node, the first field of the lock state object by performing a second RDMA operation between the first storage node and the second storage node, thereby synchronizing the lock state between the first storage node and the second storage node,
wherein the processing circuitry is further configured to execute the program instructions out of the memory to perform the first RDMA operation including performing an atomic RDMA compare-and-write (CAW) operation against a mutex value associated with a lock state object bucket that includes the lock state object.

16. The system of claim 15 wherein the processing circuitry is further configured to execute the program instructions out of the memory to perform the second RDMA operation between the first storage node and the second storage node including setting the first field of the lock state object to a value indicating that at least the second storage node is an owner of the lock.

17. A computer program product including a set of non-transitory, computer-readable media having instructions that, when executed by processing circuitry, cause the processing circuitry to perform a method of locking an entity of a storage object in a storage cluster with an active-active architecture, the method comprising:
maintaining a lock state object on a memory of a first storage node, the lock state object including a first field for a lock state of an entity of a storage object, and the memory being registered for remote direct memory access (RDMA);
in response to receipt at a second storage node of a request for a lock to access the entity of the storage object, accessing, by the second storage node, the lock state object by performing an atomic RDMA compare-and-write (CAW) operation against a mutex value associated with a lock state object bucket that includes the lock state object; and
updating, by the second storage node, the first field of the lock state object by performing a second RDMA operation between the first storage node and the second storage node, thereby synchronizing the lock state between the first storage node and the second storage node.

18. The computer program product of claim 17 wherein the performing of the second RDMA operation between the first storage node and the second storage node includes setting the first field of the lock state object to a value indicating that at least the second storage node is an owner of the lock.

19. The method of claim 14 wherein the executing of the write operation atomically with the compare operation further comprises:
in response to the comparison result indicating that the mutex value is not equal to the first predetermined value, avoiding writing the second predetermined value to the mutex field.

20. The method of claim 19 further comprising:
having avoided the writing of the second predetermined value to the mutex field, repeating the executing of the compare operation and the write operation atomically.

* * * * *